No. 714,518. Patented Nov. 25, 1902.
E. & A. PRUVOT.
BEET ROOT DIGGING MACHINE.
(Application filed June 7, 1900.)
(No Model.)
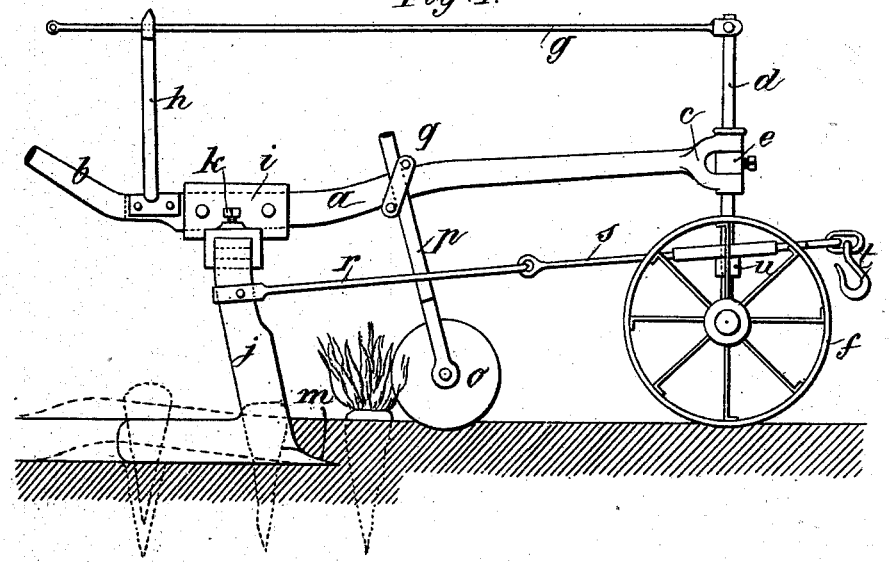
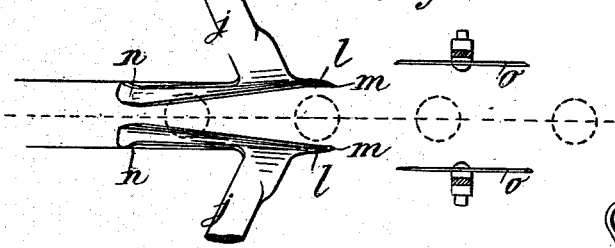
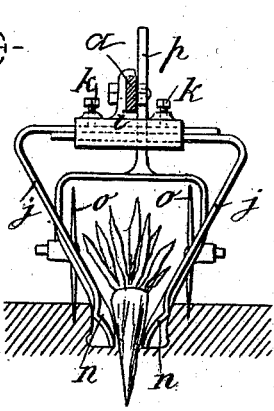
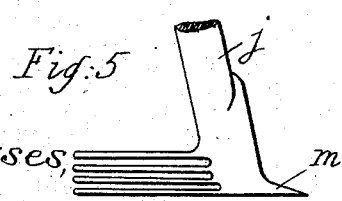
Witnesses,
L. E. Pearson
W. H. Pumphrey.
Inventors,
Ernest Pruvot
Achille Pruvot
by R. Parker Smith
their Attorney.

UNITED STATES PATENT OFFICE.

ERNEST PRUVOT AND ACHILLE PRUVOT, OF VALENCIENNES, FRANCE.

BEET-ROOT-DIGGING MACHINE.

SPECIFICATION forming part of Letters Patent No. 714,518, dated November 25, 1902.

Application filed June 7, 1900. Serial No. 19,357. (No model.)

*To all whom it may concern:*

Be it known that we, ERNEST PRUVOT and ACHILLE PRUVOT, constructors, citizens of the French Republic, residing at Valenciennes, France, have invented a certain new and useful Beet-Root-Digging Machine, of which the following is a full, clear, and exact description.

This invention relates to a machine for digging up or uprooting beet and other roots planted in a line.

In the following description of our invention we refer to the annexed drawings, in which—

Figure 1 is an elevation, and Fig. 2 is a rear view, of the machine, partly in section. Fig. 3 shows separately and in plan the device for uprooting the roots as well as the disks for cutting the leaves. Fig. 4 shows in section the appearance of the soil after the passing of the machine. Fig. 5 shows a modified form of the uprooting-blade.

Our machine consists of a frame or backbone $a$, furnished toward its rear with two handles $b\,b$, by means of which the apparatus is grasped and guided.

The front portion of the frame $a$ ends in a head or socket $c$, forming a fork. The said head engages with the upright of the fore-carriage $d$ and is maintained at a suitable height for the uprooting-blades to enter the ground by means of a collar $e$ and set-screw, as shown.

The upright $d$ is fitted at its lower portion with an axle, upon which are mounted the two wheels $f$. To the upper portion of this upright $d$ is fixed a lever $g$, bearing upon a support $h$, fixed to the backbone $a$. This support $h$ is constructed in such a manner that the lever $g$ can be shifted to the right or the left for the guidance of the machine.

Upon the backbone $a$ is located a box $i$, in which are engaged and secured the branches of the two inwardly-inclined blades $j\,j$. These can be separated or brought together, as desired, and can be held in such position by means of set-screws $k\,k$. These two blades $j\,j$ are of a special shape. (Illustrated on Figs. 1, 2, and 3.) They comprise two cutting edges $l\,l$, terminating at their lower front portions in points $m\,m$ and at their rear in two fairly-large wings or flat portions $n\,n$, (eight to ten centimeters, about.) These two wings are so shaped and arranged that their upper and lower edges are both approximately parallel to the surface of the soil and so that in their normal operation the said wings are just buried in the soil. The upper edges of the wings are parallel or nearly so, although they may converge slightly toward the rear, as shown in Fig. 3. The lower edges of the wings, however, converge sharply toward the rear, as shown in said figure of the drawings. This forms the wings into two oppositely-warped surfaces, which together form an upwardly-inclined path between them, in and along which the earth and the included beet-roots are obliged to rise as they are forced into said pathway or channel by the forward movement of the machine.

Two cutting-disks $o\,o$ are placed upon a stem or pendant $p$, fixed to the backbone $a$ by a clip or clamp $q$. These disks can turn freely upon their axles and are arranged at the medium distance of separation of the blades symmetrically with respect thereto and to the wings carried by said blades in order to prevent the choking of or damage to the latter. The disks enter the ground to a suitable depth, which enables them while turning to cut off the dead leaves.

The traction of the machine is effected by means of two rods $r\,r$, fixed to the uprooting-knives and connected to a third rod or shaft $s$, having a slot, through which passes the upright $d$ and which is terminated by a hook $t$ for draft purposes. A ring or collar $u$ allows the rod $s$ to be supported at the desired height, so that traction may take place under the best conditions.

The working of this machine is very simple. It is sufficient to lower the head $c$ until the uprooting-blades enter the soil for from about eight to ten centimeters and the disks from three to four centimeters only, so as to cut off or detach the leaves which are on the ground.

The soil passing between the two cutting portions $l\,l$ is more and more compressed by reason of the advance of the wings forming inclined planes, inasmuch as it finds a larger exit toward the top of the channel. It assumes an ascending movement according to the upwardly-inclined path or way formed by the two wings *n n*. The beet-roots which are in the particular strip of soil follow the same movement, and are thus uprooted. When the beet-roots have been pulled up, they fall back into their holes in the same position as before uprooting. The latter operation being completed, the soil viewed in section presents the appearance shown in Fig. 4—namely, the parts *v v* are not dug up. Only the parts *x x* are slightly loosened up and disturbed for a depth of from eight to ten centimeters and for a width of fifteen to eighteen centimeters.

It should be noted that the wings *l l* having a certain elasticity the beet-roots, even the largest, are able to pass through and the machine is never choked. The inclined position of the blades *j j* leaves ample space between their upper portions for the passage of the beet tops and leaves.

We may vary the constructional details of our machine without changing its essential features. Thus Fig. 5 shows a modified form of the uprooting-blades, which consists in dividing each of the wings *n n* into a series of small strips, whereby greater elasticity is obtained.

Having thus described our invention, what we claim as such, and desire to secure by Letters Patent, is—

1. In a machine of the character described, the combination with suitable supporting and traction devices, of a pair of oppositely-arranged wings parallel to the surface of the soil, and so adjusted as to be approximately buried therein, the upper edges of said wings being approximately parallel one to the other, but the lower edges of said wings converging toward the rear.

2. In a machine of the character described, the combination with suitable supporting and traction devices, of a pair of oppositely-arranged wings parallel to the surface of the soil, and so adjusted as to be approximately buried therein, the upper edges of said wings being approximately parallel one to the other, but the lower edges of said wings converging toward the rear, together with a pair of downwardly-extending cutting-blades to the lower end of which said wings are connected at their forward portions.

3. In a machine of the character described, the combination with suitable supporting and traction devices, of a pair of oppositely-arranged wings parallel to the surface of the soil, and so adjusted as to be approximately buried therein, the upper edges of said wings being approximately parallel one to the other, but the lower edges of said wings converging toward the rear, together with a pair of downwardly-extending cutting-blades to the lower end of which said wings are connected at their forward portions, and means for laterally adjusting said pairs of blades and wings.

4. In a machine of the character described, the combination with suitable supporting and traction devices, of a pair of oppositely-arranged wings parallel to the surface of the soil, and so adjusted as to be approximately buried therein, the upper edges of said wings being approximately parallel one to the other, but the lower edges of said wings converging toward the rear, together with a pair of downwardly-extending, inwardly-inclined cutting-blades, to the lower end of which said wings are connected at their forward portions.

5. In a machine of the character described, the combination with suitable supporting and traction devices, of a pair of oppositely-arranged wings parallel to the surfaces of the soil, and so adjusted as to be approximately buried therein, the upper edges of said wings being approximately parallel one to the other, but the lower edges of said wings converging toward the rear, together with a pair of rotary cutting-disks located in front of said wings symmetrical with respect thereto, and so arranged as to penetrate only a slight distance below the surface of the soil.

In testimony that we claim the foregoing as our invention we have signed our names in presence of two subscribing witnesses.

ERNEST PRUVOT.
ACHILLE PRUVOT.

Witnesses:
FONTAINE JULES,
HAINAUT HENRI.